Jan. 6, 1970  R. E. ANDERSON  3,488,656
RADIO FREQUENCY HOLOGRAMS
Filed Nov. 25, 1966  7 Sheets-Sheet 1
Fig. 1.
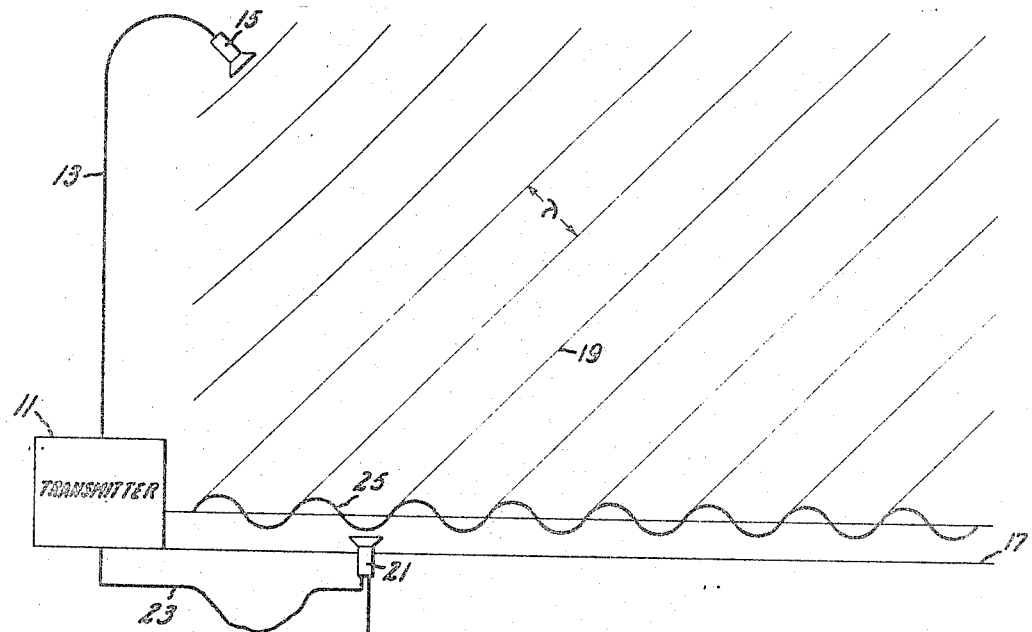
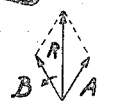
Fig. 1a.
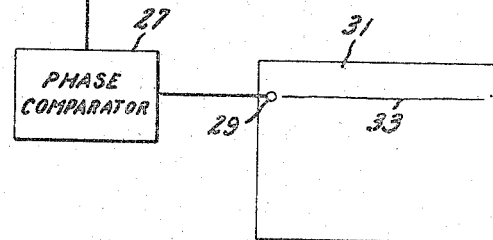
Fig. 1b.
Inventor:
Roy E. Anderson,
by Ronald R. Campbell
His Attorney.

Inventor:
Roy E. Anderson,
by Donald R. Campbell
His Attorney.

Inventor:
Roy E. Anderson,
by Donald R. Campbell
His Attorney.

Inventor:
Roy E. Anderson,
by Donald R. Campbell
His Attorney.

United States Patent Office 3,488,656
Patented Jan. 6, 1970

3,488,656
RADIO FREQUENCY HOLOGRAMS
Roy E. Anderson, Schenectady, N.Y., assignor to General Electric Company, a corporation of New York
Filed Nov. 25, 1966, Ser. No. 596,987
Int. Cl. G01s 7/01
U.S. Cl. 343—17        6 Claims

ABSTRACT OF THE DISCLOSURE

Radio frequency holograms of a radio source in space are produced by scanning at least one receiving antenna element over an extended surface preferably along substantially parallel lines spaced apart about one RF wavelength. The phase difference between the received signal and a reference phase is derived at a plurality of points and recorded on a recording medium at positions thereon which are proportional to or correspond to the location of the antenna element with respect to the scanned surface. The RF hologram so made has dimensions in viewing light wavelengths which are preferably equal to the dimensions of the scanned surface in RF wavelengths. Upon viewing with coherent light, a visual image of the radio source is formed whose relative position and size can be measured for use in radio astronomy, satellite detection and tracking, and radio direction finding, for example.

---

This invention relates to radio frequency holograms, and more particularly to a method and apparatus for producing holograms which gives a visual representation of the spatial distribution of received coherent electromagnetic radiation in the radio frequency range, including microwaves. Radio frequency holograms are useful for instance in radio astronomy, satellite and space probe detection and tracking, and radio direction finding.

As presently used, the term hologram refers to a recording of an interference pattern formed by the simultaneous interaction of a large number of wave fronts of light emanating from an object or image. The hologram usually is made by the interference between these wave fronts and the wave front of a reference beam, and the phase and amplitude information is stored on a light sensitive record media. Most commonly, the object or image is illuminated with a coherent light source, and the reflected light is combined with reference light from the same coherent source to produce a complicated interference pattern on a photographic film. The developed film is then illuminated with coherent light of the same wave length, to reconstruct the wave fronts of the object by diffraction with this substitute for the reference light waves, so that an accurate image of the original object or image appears in space. Analogies exit between coherent light waves and radio frequency waves, since both are electromagnetic waves in character, and radio frequency waves generally have spatial coherence and may also have temporal coherence. Furthermore, it will be observed that the phase and amplitude of radio frequency waves with respect to a reference can be determined at a plurality of points.

An object of the invention is to provide a novel method and apparatus for producing radio frequency holograms, to give a visual representation of the spatial distribution of received radio frequency energy emanating from various radio sources, either natural or man made, in the sky.

Another object of the invention is to create, by hologram techniques, a visual image to a highly reduced scale of radio frequency sources or of sources from which radio frequency energy is reflected. Such radio frequency holograms are useful for instance in satellite or space probe detection and tracking, radio astronomy, and radio direction finding.

Yet another object is the provision of a new and improved method and apparatus for determining the relative size and shape and possibly intensity of extended radio frequency sources as well as the relative position of radio frequency sources within the field of view of the means employed to detect the radio frequency energy.

Another object of the invention is to provide a new and improved method and apparatus for mapping sources of radio frequency in which a multiple element antenna array can be utilized, combining with the advantage of holograms the advantages of the multiple antenna array.

In the practice of the invention in its broad aspect, at least one receiving antenna element is scanned over an extended surface on the ground or in the sky to detect radio frequency energy emanating from one or more radio sources in space. The phase difference between a reference phase and the phase of the received signal is determined at a plurality of points separated from one another by at least a distance in the order of magnitude of about one wavelength of the received radio frequency energy. A quantity representative of the magnitude of the phase difference is recorded on a recording medium at positions thereon which correspond to the location of said scan points or receiving antenna element with respect to the extended surface, thus retaining proportionality. When not originally made as a hologram at light dimensions, the recording medium is reduced in size so that the dimensions of the hologram in viewing light wavelengths is preferably equal to the dimensions of the scanned extended surface in radio frequency wavelengths. Upon viewing the radio frequency hologram with coherent light, the reconstructed image shows visually the relative position and size of each radio source, and additionally provides an indication of distance to a near source.

In the preferred embodiments, the receiving antenna element is scanned along parallel or substantially parallel lines, and the radio frequency hologram therefore comprises a series of recorded lines whose intensity at each point varies as the phase difference, the spacing of the recorded lines being preferably a fraction of the viewing light wavelength.

Various antenna arrangements and means for supplying a reference phase may be employed. For example, a multiple antenna, coherently related array can be used for scanning to reduce the scan time and to combine with the advantages of the hologram technique the desirable features of the multiple antenna array.

The foregoing and other objects, features and advantages of the invention will be apparent from the following more particular description of several preferred embodiments of the invention, as illustrated in the accompanying drawing wherein:

FIG. 1 is a schematic elevational diagram of a portion of a simplified system for producing radio frequency holograms including associated recording apparatus; FIGS. 1(a) and 1(b) are diagrams useful in explaining its operation;

Figure 4:
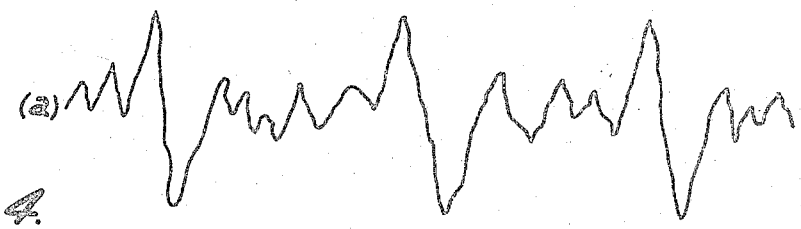
Figure 5:
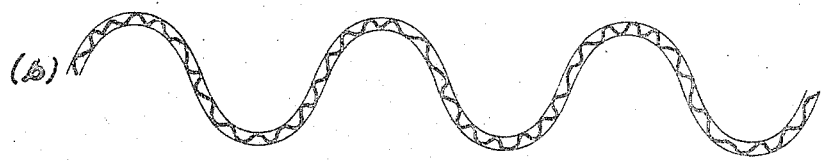
Figure 6:
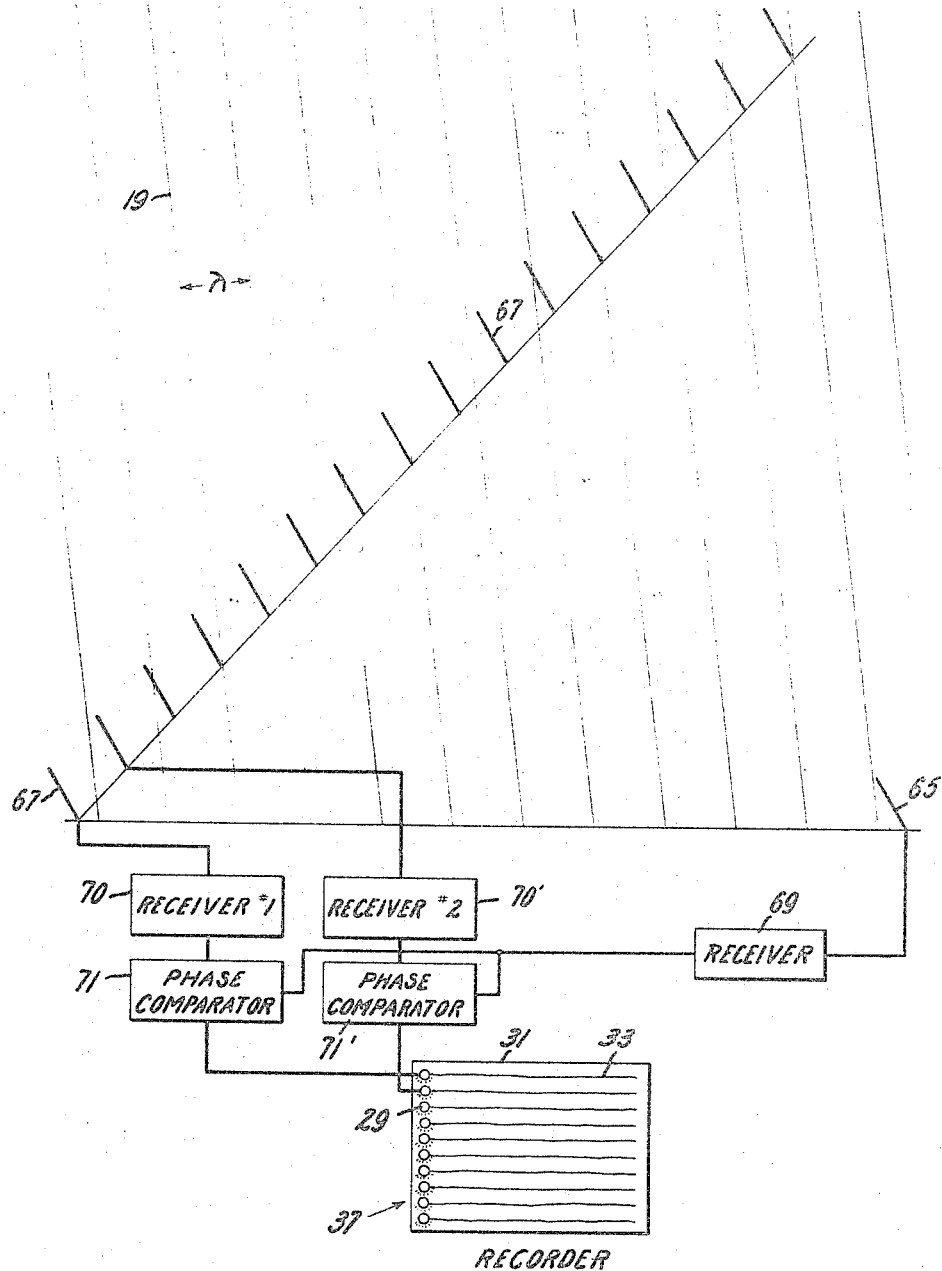
Figure 9:
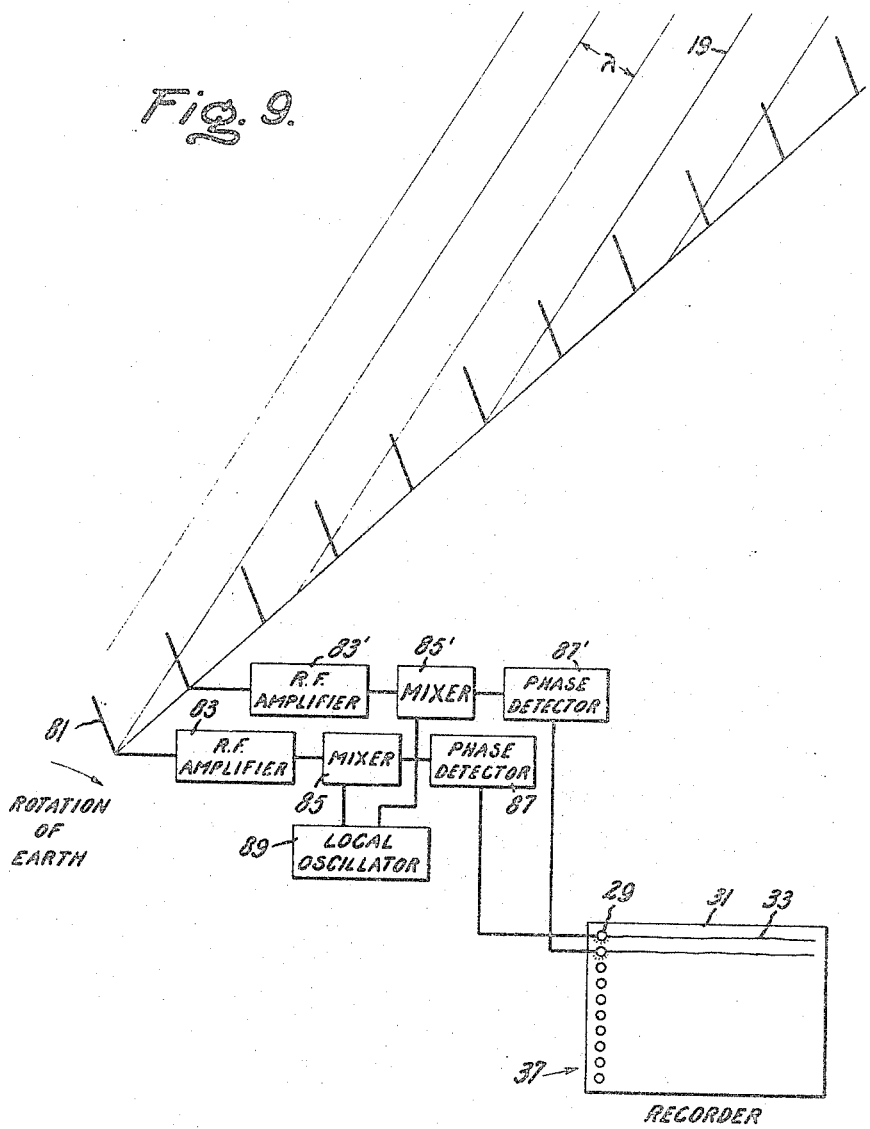
Figure 10:
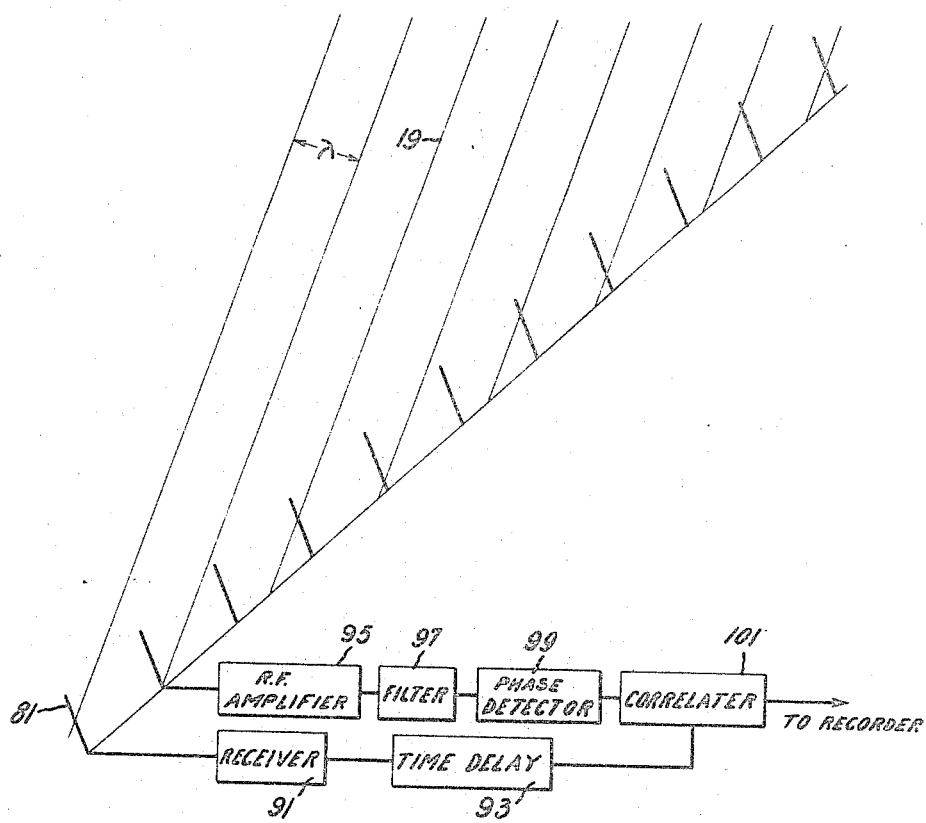
Figure 11:
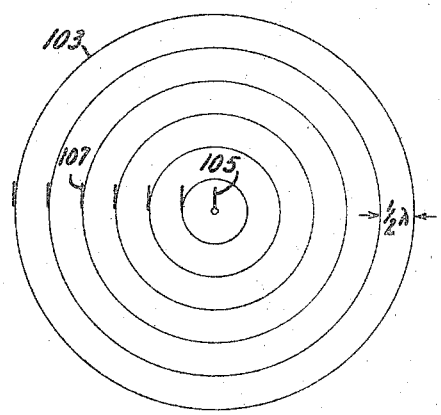

FIGS. 4(a) and 4(b) show diagrams useful in explaining processing of radiation from a very noisy radio source such as a star;

FIG. 5 is a schematic perspective view of another system for producing radio frequency holograms including apparatus for recording and viewing the hologram;

FIG. 6 is similar to a portion of FIG. 5 and shows a modification thereof employing a multiple element antenna array;

FIGS. 7 and 8(a), 8(b) and 8(c) are, respectively, schematic circuit diagrams further explanatory of the arrangement shown in FIG. 6 and diagrams useful in explaining the operation thereof;

FIG. 9 is similar to FIG. 6 and shows a modification of the antenna array;

FIG. 10 is similar to FIG. 9 and shows a modification for obtaining the reference phase; and FIG. 11 is a plan view of an extended surface illustrating circular scan lines.

In FIG. 1 is shown a simplified arrangement which illustrates the general principles of the invention and is capable of experimental verification. A transmitter 11 operating in the microwave range is connected by a transmission line 13 to a suitable transmitting antenna such as microwave horn 15 which is suspended above the ground 17 at a sufficient height that the radiation striking the ground is in the form of plane waves. The equiphase planes 19 are indicated by a series of parallel straight lines separated by the wavelength distance, $\lambda$. A receiving antenna 21 such as for instance another microwave horn is coupled by a fixed length cable 23 to the transmitter 11. The receiving antenna 21 is scanned along a straight line detecting the incoming radiation as it varies sinusoidally from one equiphase plane 19 to the next. The sinusoidal variation of the incoming microwave energy along a line slightly above ground level is shown at 25. Using the phase of the transmitter 11 as a reference phase, the phase of the received radio frequency signal is compared with this reference phase at each point as the receiving antenna 21 is scanned along a line. This is conveniently performed in a phase comparator 27. The phasor diagram in FIG. 1(a) shows the reference phasor A, the received signal phasor B which rotates about the fixed phasor as the receiving antenna is scanned in dependence on the direction of arrival of the received signal, and the resultant phasor R whose magnitude varies according to the phase difference. The signal from the phase comparator 27 is proportional to the phase difference and is coupled to a suitable recording element 29. The recording element 29 has motion relative to a recording medium or chart 31 on which a recorded line 33 is traced, such as by moving the recording medium past the recording element. As is shown in the enlarged view of the recorded line 33, FIG. 1(b), the intensity of the recording at each point varies according to the phase difference. The recording element 29 is for instance a light emitting diode whose intensity varies according to the current supplied to it, and the record medium 31 may be a photographic film. Proportionality is retained so that the relative motion of the recording element 29 and chart 31 is proportional to the scanning velocity of the receiving antenna 21, and the length of the recorded line 33 is proportional to the length of the antenna scan line.

Figure 2:
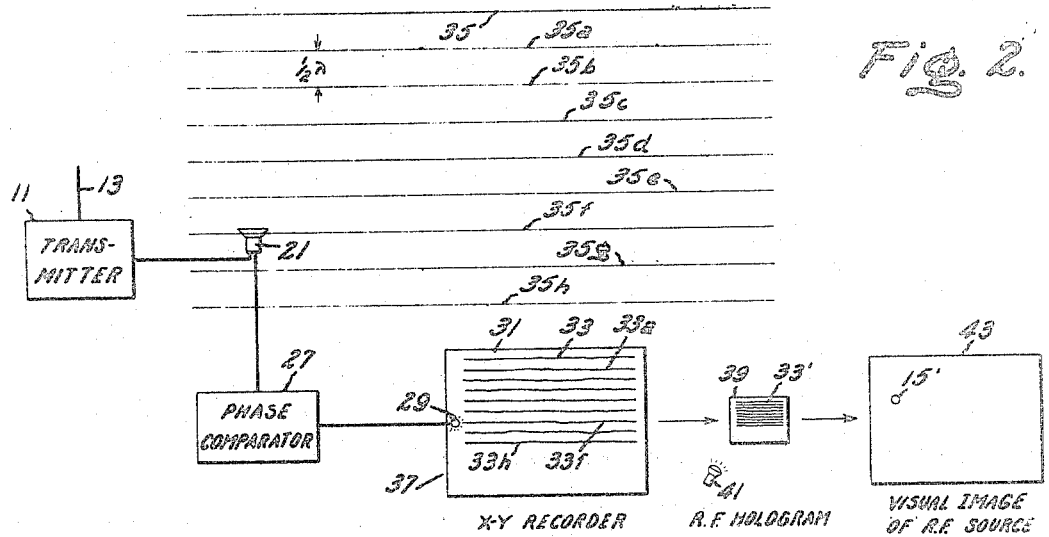
FIG. 2 is a schematic plan diagram of the system shown in FIG. 1 and includes further apparatus schematically illustrating formation and reconstruction of the hologram.

Referring to FIG. 2 one of the antenna scan lines just referred to is shown at 35. The receiving antenna 21 is now indexed and a scan is made along another of the scan lines 35a parallel to the line 35 but spaced therefrom by a distance in the order of magnitude of about one wavelength of the received signal. It has been found that there is less distortion due to the zero order image when the spacing is a fraction of the received signal wavelength. The recording element 29 is shown on an x–y recorder 37 and is indexed by an amount proportional to the spacing of the scan lines, and in like manner another recorded line 33a is traced. The receiving antenna 21 is sequentially scanned along a plurality of other parallel lines to scan line 35h, and the recording element 29 is correspondingly indexed each time to record other lines on the chart 31 up to the line 33h. Additional antenna scan lines not here shown may be scanned and corresponding recordings made on the chart 31 until a selected extended surface on the ground is covered. The result is a recorded chart 31 having a series of parallel lines whose length is proportional to the length of the scan lines 35 . . . 35h, etc. and whose spacing is proportional to the spacing of the antenna scan lines. Along each recorded line 33 . . . 33h, etc. the intensity varies as the phase difference at the corresponding point along the antenna scan lines.

The recorded chart 31 is reduced in size photographically to form a radio frequency hologram 39 wherein the spacing and length in wavelengths of the recorded lines 33' bears the same relation to the coherent light from source 41 used to view the hologram as does the spacing and length of the antenna scan lines 35 in wavelengths to the received radiation. Thus where the antenna scan lines 35 are spaced ½λ of the transmitted microwave frequency apart, the recorded lines 33' are spaced apart ½λ of the wavelength of the coherent light source 41, thereby preservicing the proportionality. Upon viewing the hologram 39 photographically reduced according to these proportions with source 41, which is for instance a laser beam, there is wavefront reconstruction and a visual image 15' of the microwave source 15 is produced and can be recorded photographically on a film 43. Since the position of the image 15' on film or photograph 43 is in proportion to the position of the original source 15 with respect to the aperture scanned by the receiving antenna 21, the position of source 15 in space can be determined by measuring its position on photograph 43. In theory the step or reducing the recorded chart 31 to hologram size is not essential, as it might be possible to record the chart 31 directly at hologram size, but this would be in the magnitude of about a fraction of a millimeter square.

Figure 3:
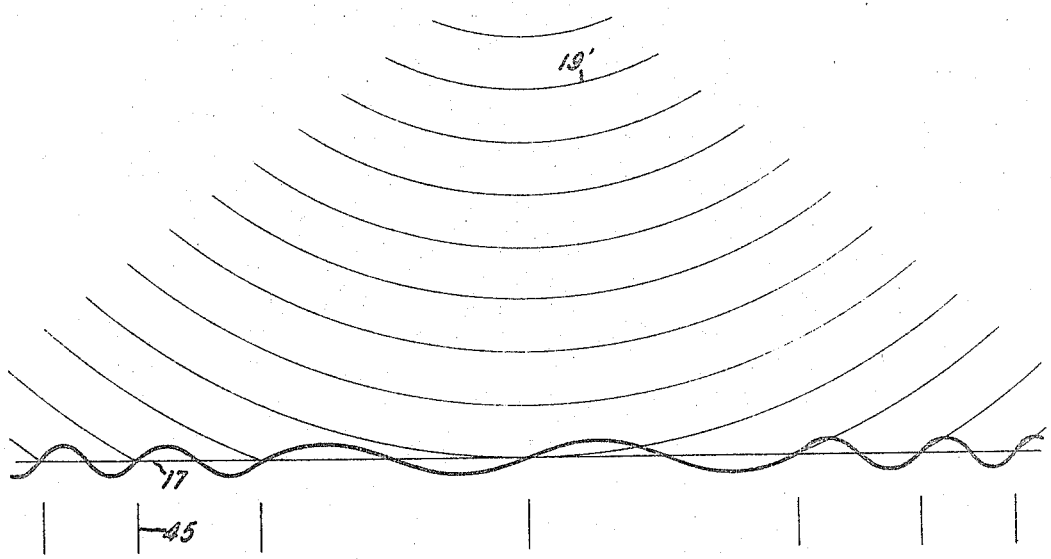
FIG. 3 is a schematic elevational diagram similar to a portion of FIG. 1 for the case of a radio frequency source in the near field.

It will be recognized (see FIG. 1) that the pattern of radiation detected by receiving antenna 21 as it is scanned over an extended surface on the ground varies according to the location of source 15. That is the location of the plane wave fronts 19 at ground level is dependent on the location of the source 15 and the direction of arrival of the received signal. Furthermore, in the event that several sources are positioned within the aperture being scanned, each contributes to a complicated phase variation pattern and each is visually imaged in photograph 43. When the source is extended, the size and shape and possibly the relative intensity of the source are indicated. For a microwave or radio frequency source S in the near field of the receiving antenna (see FIG. 3), the equiphase planes 19' of the radiation are slightly spherical at ground level 17. Accordingly, the distances between equiphase planes 19' along an antenna scan line are no longer equal as was the case with the plane wave fronts shown in FIG. 1, but rather vary with some degree of symmetry as illustrated in FIG. 3. These variations show up in like manner in recorded lines 33, whose intensity vary according to the distance of the source S above the ground and its x–y position within the scanned aperture. When a plurality of antenna scan lines are scanned and recorded on chart 31, the variations produced by a near source appear as a circular pattern, and upon reducing to hologram size and viewing with coherent light, the size of the circular patterns with respect to the size of the source are an indication of the distance to the source.

It is apparent to those familiar with the principles of holography that the recorded chart 31 shown in FIG. 2 is in the nature of an enlarged hologram for plane scattered and reference wave fronts, in that it has a raster configuration and contains the zone plate information. The arrangement is like that of a modulated interference grating or diffraction pattern, in the form taken by some holograms made with refracted, collimated reference light. The phase of the radio frequency or microwave source has been compared with a reference phase at a large number of points over an extended surface on the ground, along lines spaced from one another by no greater than one or a few or less than one wavelength of the received radiation, and an amplitude representative of the phase difference has been suitably recorded in the nature of a diffraction or interference pattern. Upon reducing the recorded chart 31 to light dimensions, it is in fact a hologram as the term is commonly used. With the microwave or radio frequency source in the near field, the manner in which the distance to the source is determined can be seen in FIG. 3 by imagining that the lines 45, each of which is at the same phase, are the dark recorded lines in an interference grating pattern. During reconstruction the incident light is bent through a greater angle for smaller grating spacings, similar to the action of a Fresnel lens, thereby focusing the light to form an image and providing by reason of the pattern of variation of grating spacings an indication of the distance to the near source S.

This general method, which has been discussed with regard to a microwave source actuated by a transmitter located on the ground and connected to the source by a transmission line, can be extended, with modification, to the detection and recording of radio source in the sky or in space (the term "space" as herein used refers generically to both) for uses such as in radio astronomy, the detection and tracking of satellites and deep space probes, and radio direction finding. The method can be applied to any portion of the radio frequency spectrum, which is defined as any frequency at which coherent electromagnetic radiation of energy is possible. It is only necessary that the radio frequency energy have spatial coherence. It is recognized that some radio sources, particularly if they are the natural sources used in radio astronomy or very distant space probes, will have a very poor signal to noise ratio at each of the receiving antennas; hence there will be a great deal of noise on the recorded hologram. It has been shown at light frequencies that the presence of noise, in that case introduced by graininess in the film, does not affect the resolution of the hologram or the ability to detect the image in the presence of the noise, although the noise or graininess is visible in the reproduced image. When making radio frequency holograms, the noise at one position as the receiving antenna is being scanned over a surface on the ground, is the same as the noise at another position, and the noise adds incoherently and reproduces as noise while the received coherent radio frequency signal produces a coherent pattern in the hologram that is detectable even though the signal to noise ratio at the receiving antenna is very poor.

A natural radio source in the sky such as a radio star frequently has an extremely noise-like pattern as shown for instance in FIG. 4(a). To account for this in the making of radio frequency holograms, the signal used to make the recorded chart 31 can be limited to a relatively narrow bandwidth by reducing the pass bandwidth of the receivers of the antenna elements. The effect of this filtering is that the received signal looks like a noisy sine wave such as is illustrated in FIG. 4(b). As an example of the extent to which it is necessary to narrow the bandwidth of detected radiation from a radio star, for an antenna scan length of one thousand wavelengths, reduction to $1/10$ of a wavelength produces a good enough sine wave so that a usable interference pattern is produced. For a carrier frequency of 1000 mc., the filter bandwidth is $1/10^4$ of the carrier frequency, or 100 kc. As will be explained in greater detail later, in making the phase comparison it may be possible to open up the bandwidth by measuring the time delay of the received signal with respect to an initial time and using the time delay as a measure of a reference phase.

In making radio frequency holograms of various radio sources in space, the phase of the actually transmitted signal is usually not available as was the case in discussing FIG. 1, although it would be known for the case of a body being illuminated with radio frequency energy from a transmitter located on the earth. Accordingly, it is ordinarily necessary to use a different arrangement of apparatus for determining a reference phase with which the phase of the incoming signal can be compared at various points over an extended surface. The arrangement shown in FIG. 5 uses a second receiving antenna 47 for obtaining a reference phase. The antenna element 47 is fixed in place while the other receiving antenna element 49 is movable and is scanned along a plurality of antenna scan lines 51 . . . 51e spaced from one another by about a fraction of a chosen radio frequency wavelength. Both of the antenna elements 47 and 49 are simple antennas and have a wide field of view. The length of the antenna scan lines 51 for the purposes of illustration is about 1000 wavelengths. This scans a sufficiently wide aperture in the sky to give some meaningful information without requiring excessively long scan times. For a distant radio source 53, the equiphase planes 19 have plane wavefronts and the movable antenna 49 intersects a plurality of equiphase planes each time it makes a scan along a line.

Simplified block diagram appaartus for processing the incoming signals detected by fixed antenna 47 include an RF amplifier 55 and a phase detector 57. In a similar manner, the signal received by movable antenna 49 is amplified by RF amplifier 59 and analyzed by a phase detector 61. A phase comparator 63 compares the reference phasor derived from antenna element 47 and the phasor at the various points along the antenna scan lines derived from antenna element 49 and produces a signal representative of the magnitude of the phase difference.

From this point on the method is the same as has been described with reference to FIG. 1. The phase difference between the received signal at movable antenna 49 and the reference phase varies continuously according to the direction of arrival of the signal, and the intensity of the recorded lines 33 produced on chart 31 by the recording element 29 changes in like manner. In making the recorded chart 31, the position of the recording element 29 is proportional or corresponds to the position of the movable antenna 49 with respect to the extended surface on the ground over which the scan is made, and the spacing and length of the recorded lines 33 are proportional to the spacing and length of the antenna scan lines 51. The recorded chart 31 is reduced photographically in size to light wave dimensions to form the radio frequency hologram 39. Upon viewing the hologram 39 with coherent light from source 41, and recording the visual images produced on film 43, there is obtained a visual image of the radio sources in the sky within the portion of space scanned by the movable antenna 49. If several radio sources are present they are each shown in their relative position on film 43, and the relative size and shape and possibly intensity of each radio source in an appropriate case is shown pictorially.

An advantage of the radio frequency hologram technique is that there is a processing gain. Every point in the hologram contributes to the formation of the image. As was previously mentioned, the received coherent radio frequency signal adds coherently and the reconstructed image is derived from many points on the hologram, in the nature of a zone plate lens. Noise, on the other hand, adds incoherently so that the signal to noise ratio can be poor. Another advantage is that it is possible to change the scanning rate to vary integration of the signals as desired and thereby change the sensitivity. For example, at a slower scanning rate, there is a greater degree of signal integration and higher sensitivity. Furthermore, by using this technique there is obtained the wide field of view of a single simple antenna element, but the resolution and sensitvity are comparable to an antenna whose aperture is as large as the whole scanned area.

For some applications the relatively long scan time necessitated by the use of only one movable receiving antenna element is not satisfactory and shorter scan times are required. For instance, when tracking a satellite which is moving across the field of view of the receiving antenna, the satellite may have moved a sufficiently large distance during the scan time that the image produced upon reconstruction of the hologram is excessively extended or distorted. Another situation where a shorter scan time is needed is when attempting to detect a non-cooperative space probe having relatively short transmission periods. For these and other circumstances where the same considerations apply, the use of an array of coherently related antenna elements is advantageous. The multiple element, coherently related array preferably includes a plurality of identical simple antenna elements arranged in a row and spaced from one another by about a fraction of a wavelength of the received radio frequency radiation. The various antenna elements in the array move at approximately the same rate of speed to simultaneously scan a plurality of antenna scan lines over an extended surface. The combination of the multiple antenna element array with the hologram technique provides the advantages of simultaneous reception of many signals within a large solid angle while retaining the large projected aperture of the array. In addition, the hologram technique simplifies the signal processing and yields a more easily implemented direct display than is obtained, for instance, with presently used phased array techniques.

An illustrative multiple element array used for making radio frequency holograms is shown in FIG. 6. In this array there is one fixed receiving antenna element 65 for providing a reference phase. A plurality of movable receiving antenna elements 67 are arranged in a row spaced equally from one another by about a fraction of the wavelength of the radio frequency energy being received. Let it be assumed that the radio frequency is about 1000 mc., for which the wavelength is about one foot. A reasonable scan time over a reasonably large aperture is provided by a row of 1000 of the movable elements 67. The length of the antenna scan lines, i.e. the initial distance between the row of movable antennas 67 and the fixed antenna 65, is about 1000 wavelengths or about 1000 feet, and the rate of motion of the movable antennas 67 is on order of about 10 feet per second or approximately 7 miles per hour. For this example it is seen that the scan time is about 100 seconds. Of course, the actual number of elements in the multiple element array and speed of scanning is determined by the allowable scan time and degree of sensitivity desired. In the extreme case, the multiple element array may comprise a million fixed elements, 1000 on a side, which produces the hologram in a fraction of a second since all the information is received simultaneously. However, for some applications this may be too large a number of antennas. The assumption in the example of 1000 elements in a row is considered to be a feasible number for many applications, and one that will provide a reasonable scanning time.

The apparatus required to process the incoming signals is similar to that which has already been described. The fixed antenna element 65 is coupled to a receiver 69, and the first of the movable antenna elements 67 is coupled to a receiver 70, these in turn being inputs to phase comparator 71 which continuously produces a signal representative of the magnitude of the phase difference as the row of movable elements is scanned toward the fixed element. The x–y recorder 37 is equipped with a plurality of the recording elements 29, one for each scan line or movable antenna element 67, and the phase comparator 71 for the first of the movable elements 67 is coupled to the first of the recording elements 29. The received signal from the second of the movable antenna elements 67 is coupled to a second receiver 70' and a phase comparator 71' which compares it with the signal from fixed element 65 and provides the phase difference which determines the intensity of recording by the second of the recording elements 29. With this form of multiple element array, all of the recorded lines 33 on the chart 31 are made simultaneously as the scan is made and the recording elements 29 and chart 31 move relative to one another at a proportional speed.

Figure 7:
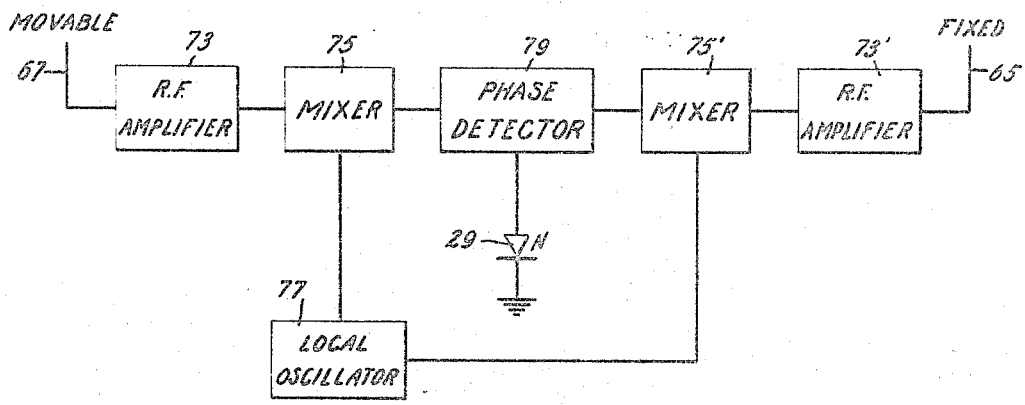

To elaborate on the way in which the phase difference of the incoming signals to the fixed antenna 65 and the movable antenna 67 can be obtained as the scan is made, the use of the heterodyning principle may be employed as illustrated in FIG. 7. The signal from movable antenna 67 is applied to RF amplifier 73, and the amplified signal is coupled to one input of mixer 75 which has as a second input the signal from a local oscillator 77. The selected output of mixer 75 is applied to a phase detector 79. The signal from fixed antenna 65 is coupled to RF amplifier 73' and hence to a mixer 75' which is also supplied from the local oscillator 77 with a signal which is 180° out of phase with the signal applied to the other mixer 75. The output of mixer 75' is coupled to the phase detector and comparator 79 which produces an output signal representative of the magnitude of the phase difference for varying the intensity of the recording made by recording element 29, which as was mentioned previously can be a light emitting diode.

Figure 8:
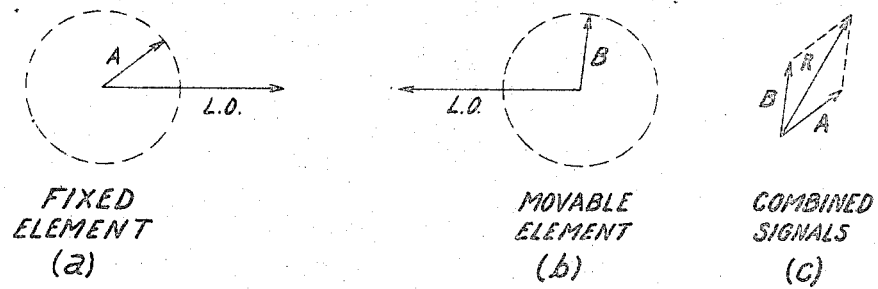

It is appreciated that the row of movable antenna elements 67 receives signals from all sources within its coverage angle and within the pass band of the receivers. FIGS. 8(a), 8(b) and 8(c) illustrate the local oscillator and signal relationships for a single signal within the pass band but at a different frequency than the local oscillator. Synchronous detection is not necessary nor is it possible if a wide bandwidth is to be accommodated. Considering the local oscillator and received signal combination at the fixed element receiver, the signal phasor A rotates at the difference frequency between the signal and the local oscillator (L.O.). The local oscillator is applied 180° out of phase to the signal phasor B for the movable elements (A and B are the same signal). When the phasors A and B are combined, the L.O. signals cancel, leaving a resultant phasor R rotating at the difference frequency between the local oscillator and the signal frequency, but with a magnitude determined by the instantaneous separation of the antenna elements 65 and 67 and the direction of arrival; i.e., the phasor R will have a resultant amplitude proportional to the phase difference at the two antennas. This amplitude is detected and supplied to the recording element 29. Signal processing in this manner in effect establishes the fixed element signal as the reference against which the moving element signal is compared, and synchronous detection is not required.

Variations on the array arrangement shown in FIG. 6 are readily suggested. It is possible to use a row of 1000 movable antenna elements and a row of 1000 fixed elements to provide more received energy per unit time and hence permit a shorter scan time for a given processed signal to noise ratio. The hologram may also be produced by using 1000 fixed elements and one movable element.

In FIG. 9 is shown a slightly different type of multiple element, coherently related array suitable for instance for a system for a deep space probe detection and tracking. A single row of simple receiving antennas 81 is provided and are placed along a north-south line with a spacing of approximately a fraction of a radio frequency wavelength. Each antenna 81 feeds a low noise RF amplifier 83 followed by a mixer 85 and phase detector 87. Indentical apparatus is provided for the other antennas, the apparatus for the second antenna element being indicated by corresponding primed numerals. All of the mixers in the receivers are driven by the same local oscillator 89 with the phasing adjusted to each receiver to simulate a plane wave front reference phase. If the antennas 81 are in a truly straight line the local oscillator phase is the same at all receivers, however if they are not in a straight line, as for example due to the curvature of the earth, the phases are adjusted to have the effect of placing the antennas in a straight line.

The radio frequency signal from the distant space probe arrives at the array with a plane wave front which produces phase differences at the various antennas 81 depending upon the direction of arrival of the signal. Therefore the phase difference between the local oscillator references and the received signal phase at the receiver for each antenna will have a variation along the array depending upon the direction of arrival. As the earth rotates, the north-south line of antennas is scanned in a west to east direction and receives a varying pattern of phase changes at the individual antennas which is dependent upon the component of the direction of arrival of the signal in the east-west direction. Hence, the scanning of the array by the rotation of the earth produces the effect over a period of time of having a movable row of antennas. As was the case before, each antenna is connected to an individual recording element 29 in the x–y recorder 37. As the phase differences between the references and the received signal change, the intensity of recording is modulated correspondingly.

A variation of the signal processing from that shown in FIG. 9 is that the fixed array of a row of simple antennas is mounted at a suitable elevation above a large conducting area such as the surface of a smooth sea. As the earth turns, the direct and reflected signals from the sources in the sky combine at the outputs of the fixed array to produce the signals necessary for the hologram recording.

Another modification shown in FIG. 10 uses time delay to determine a reference phase. This modification also employs a filter for the received signal to limit the pass bandwidth to a small percentage of the received frequencies as has been explained with regard to noisy signals from a star, as has been illustrated in FIGS. 4(a) and (b). It will be recalled that the effect of filtering is to produce a noisy sine wave. The signal from the first antenna element 81 is coupled to a receiver 91 and time delay circuit 93 to provide basis for a reference phase. The signal from the second and succeeding elements is applied through amplifier 95, filter 97 and phase detector 99 to correlator 101 where the phase difference between the reference and the received signal is derived for actuating the recording elements. It is also possible to supply a compensating phase to one element while letting the other elements rotate.

Various scan techniques and techniques for comprising the receiving antenna element signals with a reference have been described. Although scanning over an extended surface on or near the ground has been explained, it is also possible to scan over an extended surface in the sky such as would occur when the antenna elements are mounted in satellites. Furthermore, it is not essential to use straight scan lines as have been employed in the various embodiments illustrated to this point. In FIG. 11, the scan lines 103 are circular and concentric about the center where the fixed antenna element 105 is mounted. A plurality of movable antenna elements 107 are mounted in a row and are swept together about the center to make the scan. Preferably the concentric scan lines are spaced apart a fraction of the wavelength of the received energy. It is also possible to scan along a spiral, where again the adjacent loops of the spiral are spaced apart preferably by a fraction of the wavelength of the radio frequency energy. It will be recognized that the scan lines of a spiral pattern are substantially parallel. Either a single receiving element or a multiple element, coherently related array can be employed for scanning along circles or a spiral.

When making a circular or a spiral scan, the recorded lines produced on the enlarged holographic chart (31 in FIG. 2) or on the radio frequency hologram (39 in FIG. 2) will be circular or spiral, since the phase difference at a point on the extended surface being scanned is recorded at a corresponding position with respect to the boundaries of the record medium on which the recording is being made. In considering the invention according to its broadest aspect, it is indeed not essential to scan along straight, circular or spiral scan lines, since all that is required is that a quantity representative of the phase difference be recorded on the record medium at a position corresponding to the position of the receiving antenna. Thus the recording can be made sequentially at random points or along scan lines which are skewed with respect to one another rather than being parallel or substantially parallel. However, in making a radio frequency hologram in this random fashion, it should be remembered that points at which the phase difference is derived and recorded should be spaced from one another preferably by a fraction of a wavelength of the received energy. A systematic approach of sampling at a matrix of points has already been discussed with regard to a multiple element, coherently related array comprising one million elements, 1000 on a side, wherein all the information is obtained at one time. In this arrangement the matrix spacing is preferably about one wavelength or a fraction of a wavelength.

Other recording techniques can also be employed in addition to the exposure of film by a light emitting diode to which the current varies according to the phase difference as previously described. The recording media could also include ink paper, current sensitive media, electrostatic, photoplastics and thermoplastics. With the use of a deformable film such as photoplastic recording film (PPR) or thermoplastic recording film (TPR) as the recording media, there is only a phase image and there is no amplitude image when the recording is performed and may be preferable to film. PPR and TPR both offer a prospect for operation with instantaneous dry processing. The PPR writing can be implemented by such methods as an optically reduced cathode ray tube signal display or a linear array of modulated light emitting diodes. The TPR can be written directly with an electron beam in a special vacuum chamber. It will be noted that when the hologram recording and display by viewing with coherent light are implemented in real time, the radio frequency hologram may be of value for aircraft surveillance, or have application to ionospheric studies and radio direction finding.

With the use of a large number of receiving antenna elements in a multiple element, coherently related array such as has been described, it is to be expected that each antenna element will be relatively simple and inexpensive. All the antennas in an array are preferably identical and each may be a dipole or a moderate gain antenna such as a yagi or helix if it is desired to restrict the field of view and increase total aperture. The moderate gain elements can be steerable if it is desirable to change the pointing direction of the array covered angle. It might be mentioned that the multiple element, coherently related array has an angle of view which is that of a single element of the array. Since all elements of the array combine to produce the output signal, the effective aperture equals the sum of the apertures of the individual elements projected in the direction from which the signal is being received, i.e., the full aperture multiplied by the cosine of the angle between the array axis and the direction of arrival. As an example, if each element of the array has an effective aperture of one square wavelength, the field of view is one steradian. If there were one thousand elements in the array, its total effective aperture or capture area for signals near the array axis is one thousand square wavelengths.

By reason of the simultaneous scan of a large solid angle, the multiple element coherently related array reduces by orders of magnitude the time required for acquisition of a target when the pointing angles to the target, or indeed their very presence, are not known. Large reflectors with pencil or fan beams can be built to have sufficient aperture for the detection of signals, but acquisition is a problem unless the pointing angles are known to approximate the beam width of the antenna which in many cases is only a fraction of a degree.

The combination of the multiple element array and the hologram recording technique is well adapted to integration for the detection of extremely weak signals. Integration times are controllable and may correspond to those used by radio astronomers in measuring signals from radio stars. This integration may be applicable only to stationary or slowly moving sources like synchronous satellites, deep space probes, or sidereal objects such as radio stars. Of course a shorter integration time is available for detecting low-orbit satellites because of their higher angular rates, but their larger signal amplitudes may permit their detection.

Another advantage of this technique is the usefully wide bandwidth. Production of a hologram requires that the signal be coherent, although the coherence does not have to be perfect either in space or time. The tolerance on coherence sets a theoretical upper limit on the bandwidth that the system will accommodate. The limitations are set by the need to restrict bandwidth to achieve signal to noise ratios that will give enough contrast in the recordings to permit detection of discrete sources in a noisy background. A secondary consideration is that of distortion, in that reconstruction of a hologram by a light wavelength which is not in the same scale to the hologram that the radio wavelength was to the array spacing will give rise to abberations that distort or blur the reconstructed source. Since the noise limitation is so much more restrictive than the wavelength scaling, these distortions and abberations are not likely to impose any practical limitations to bandwidth.

The problems of detecting and tracking non-cooperative deep space probes has been mentioned. Such deep space probes are difficult to detect and track for two reasons, in that their transmissions may be limited to short periods at unknown, infrequent intervals, and that neither the frequency of the transmission nor the pointing angles to the probe may be known accurately. Because of these uncertainties, a search pattern must be established such that the search through the full range of uncertainty in both frequency and angle is completed within the shortest expected transmission interval, and the search must be continually repeated until acquisition occurs. With the tracking systems presently in use such as a narrow beam, high gain antenna and a coherent receiver, it may be impossible to complete the search in the short transmission interval. Detection and tracking as herein taught overcomes these problems.

The large effective aperture and capability for signal integration give the multiple element array-hologram system advantages for radio astronomy. A further advantage is in the type of display. When care is taken to make the receivers and recording linear, the display is a map of radio soruces within the large solid angle of the beam antenna. The wide angle view is achieved by integrating signals from all sources in the beam simultaneously rather than point by point.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters Patent of the United States is:

1. A method for producing and viewing a radio frequency hologram of a radio source in space comprising the steps of
moving one or a relatively small number of receiving antenna elements over an extended surface at a plurality of points spaced from one another by a distance in the order of magnitude of about one wavelength of the received radio frequency signal from said source,
deriving at each of said points the phase difference between a reference phase and the phase of said received signal,
recording a quantity representative of the magnitude of the phase difference on a record medium at positions thereon which correspond to the location of each said receiving antenna element with respect to the extended surface as said antenna is scanned, to produce a radio frequency hologram having a plurality of recorded points whose intensity varies as the phase difference, said radio frequency hologram having dimensions in viewing light wavelengths which are approximately equal to the dimensions of said extended surface in radio frequency wavelengths, and
viewing said radio frequency hologram with coherent light having the viewing light wavelength to reconstruct a visual image of the radio source.

2. A method for producing and viewing a radio frequency hologram of a radio source in space comprising the steps of
moving a plurality of receiving antenna elements not exceeding one element per scan line over an extended surface along a plurality of substantially parallel scan lines equally spaced from one another by a distance in the order of magnitude of about one wavelength of the received radio frequency signal from said source,
deriving at each point along each of said scan lines the phase difference between a reference phase obtained from the received signal and the phase of said received signal at each antenna element,
recording a quantity representative of the magnitude of the phase difference on a record medium at positions thereon which correspond to the location of each said receiving antenna with respect to said extended surface as said antenna is scanned, to produce a radio frequency hologram having a plurality of recorded lines whose intensity varies as the phase difference and which have a spacing and length in viewing light wavelengths approximately equal to the spacing and length of said antenna scan lines in radio frequency wavelengths, and
viewing said radio frequency hologram with coherent light having the viewing light wavelength to reconstruct a visual image of the radio source.

3. A method as defined in claim 2 wherein said step of recording a quantity representative of the phase difference on a record medium produces an enlarged holographic chart having dimensions greater than the dimensions of the viewing light wavelength, and including the additional step of
photographically reducing the size of said enlarged holographic chart to viewing light wavelength dimensions to thereby produce the radio frequency hologram.

4. Apparatus for recording a radio frequency hologram of a radio source in space comprising
a plurality of receiving antenna elements not exceeding one element per scan line mounted within an extended surface for scanning along a plurality of substantially parallel antenna scan lines spaced from one another by a distance in the order of magnitude of one wavelength of the received radio frequency signal from said source,
means for detecting the phase of the received signal at each point along each of the scan lines as the scanning is performed,
means for deriving a reference radio frequency phase with respect to the received signal,
means for continuously deriving a signal representative of the phase difference between the reference phase and the phase of the received signal at each antenna element, and
means for recording on a record medium a plurality of recorded lines, one for each of said antenna scan lines, the intensity of which at each point varies according to the phase difference signal, said recorded lines having a spacing and length in viewing light wavelengths approximately equal to the spacing and length of said antenna scan lines in radio frequency wavelengths, to thereby produce a radio frequency hologram, wherein said recording means includes an electro-optical recording element which is coupled to receive the phase difference signal and which has motion relative to the record medium, and the record medium is a photographic film, said recording element having positions with respect to the photographic record medium as the scanning is performed which correspond to the location of said receiving antenna element with respect to the extended surface on the ground as said antenna element is scanned.

5. Apparatus for recording a radio frequency hologram of a radio source in space comprising a plurality of receiving antenna elements not exceeding one element per scan line mounted within an extended surface for scanning along a plurality of substantially parallel antenna scan lines spaced from one another by a distance in the order of magnitude of one wavelength of the received radio frequency signal from said source, means for detecting the phase of the received signal at each point along each of the scan lines as the scanning is performed, means for deriving a reference radio frequency phase with respect to the received signal, means for continuously deriving a signal representative of the phase difference between the reference phase and the phase of the received signal at each antenna element, and means for recording on a record medium a plurality of recorded lines, one for each of said antenna scan lines, the intensity of which at each point varies according to the phase difference signal, said recorded lines having a spacing and length in viewing light wavelengths approximately equal to the spacing and length of said antenna scan lines in radio frequency wavelengths, to thereby produce a radio frequency hologram, wherein said recording means includes an electro-optical recording element which is coupled to receive the phase difference signal and which has motion relative to the record medium, and said record medium is a photographic film, said recording element having positions with respect to the record medium as the scanning is performed which correspond to the location of said receiving antenna element with respect to the extended surface as said antenna element is scanned, the recorded record medium having dimensions greater than the light wavelength dimensions of the radio frequency hologram, and further including means for photographically reducing the size of said recorded record medium to viewing light wavelength dimensions to form the radio frequency hologram.

6. Apparatus for recording a radio frequency hologram of a radio source in space comprising an array of receiving antenna elements comprising a row of the antenna elements equally spaced from one another by less than one wavelength of the received radio frequency signal from the radio source and mounted within an extended surface for scanning along a plurality of antenna scan lines, one for each of the antenna elements, positioned orthogonal to the row of antenna elements, means comprising at least one receiving antenna element for deriving a reference phase signal, means coupled to each of the antenna elements in the row for deriving at each point along its respective scan line a signal representative of the magnitude of the phase difference between the reference phase signal and the phase of the received signal from said radio source, a recorder having a plurality of light emitting semiconductor diode recording elements, one for each of the antenna scan lines, which have motion relative to a photographic record medium to trace a plurality of recorded lines as the scanning is performed whose intensity varies according to the phase difference signal and whose spacing and length are approximately proportional to the spacing and length of said antenna scan lines, to thereby trace an enlarged holographic chart, and means for photographically reducing the size of the enlarged holographic chart to viewing light wavelength dimensions so that the spacing and length of said recorded lines in viewing coherent light wavelengths is approximately equal to the spacing and length of said antenna scan lines in radio frequency wavelengths, to thereby produce the radio frequency hologram.

References Cited

UNITED STATES PATENTS

| | | | |
|---|---|---|---|
| 2,958,866 | 11/1960 | Atanasoff | 343—113.1 |
| 3,158,861 | 11/1964 | Iribe | 343—17.7 |
| 3,237,196 | 2/1966 | Hampton | 343—105 |
| 3,284,799 | 11/1966 | Ross | 343—17 XR |

OTHER REFERENCES

Leith et al.: "Reconstructed Wavefronts and Communication Theory," J.O.S.A., vol. 52, #10, October 1962, pp. 1123–1130.

RODNEY D. BENNETT, JR., Primary Examiner

C. E. WANDS, Assistant Examiner

U.S. Cl. X.R.

178—6.7; 350—3.5